(12) United States Patent
Muramatsu et al.

(10) Patent No.: US 9,272,715 B2
(45) Date of Patent: Mar. 1, 2016

(54) STEERING ASSISTANCE DISPLAY DEVICE

(71) Applicant: Toyota Jidosha Kabushiki Kaisha, Toyota-shi Aichi-ken (JP)

(72) Inventors: Yoshiyuki Muramatsu, Aichi-ken (JP); Takashi Ohsawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/300,778

(22) Filed: Jun. 10, 2014

(65) Prior Publication Data

US 2014/0371988 A1   Dec. 18, 2014

(30) Foreign Application Priority Data

Jun. 12, 2013 (JP) .................................. 2013-124136

(51) Int. Cl.
*B60W 40/114* (2012.01)
*B60W 40/105* (2012.01)
*B62D 15/02* (2006.01)

(52) U.S. Cl.
CPC ........... *B60W 40/114* (2013.01); *B60W 40/105* (2013.01); *B62D 15/0295* (2013.01)

(58) Field of Classification Search
None
See application file for complete search history.

(56) References Cited

U.S. PATENT DOCUMENTS

| | | | |
|---|---|---|---|
| 5,661,650 A | * | 8/1997 | Sekine et al. ................... 701/82 |
| 2004/0143416 A1 | * | 7/2004 | Hattori et al. ................. 702/157 |
| 2004/0206570 A1 | * | 10/2004 | Tajima et al. ................. 180/402 |
| 2008/0211651 A1 | * | 9/2008 | Beutnagel-Buchner et al. ............................ 340/459 |

FOREIGN PATENT DOCUMENTS

| | | | | |
|---|---|---|---|---|
| JP | 01136881 A | | 5/1989 | |
| JP | 05-058196 A | | 3/1993 | |
| JP | 2005-329785 A | | 12/2005 | |
| JP | 2008-137557 A | | 6/2008 | |
| JP | 2011-070311 A | | 4/2011 | |
| JP | 2011070311 A | * | 4/2011 | ............... G08G 1/16 |

* cited by examiner

*Primary Examiner* — Mussa A Shaawat
*Assistant Examiner* — Abdhesh Jha
(74) *Attorney, Agent, or Firm* — Dinsmore & Shohl LLP

(57) ABSTRACT

The steering assistance display device according to this invention includes: a determination unit determining a radius of a curved road on which a vehicle travels, and a velocity and a steering angle of the vehicle; a calculation unit calculating a direction of travel of the vehicle on the basis of an inertial force determined on the basis of the radius and the velocity of the vehicle, and the steering angle; and a display unit displaying by a head-up display a direction of travel.

4 Claims, 12 Drawing Sheets

STEERING ASSISTANCE DISPLAY DEVICE

INCORPORATION BY REFERENCE

The disclosure of Japanese Patent Application No. 2013-124136 filed on Jun. 12, 2013 including the specification, drawings and abstract is incorporated herein by reference in its entirety.

BACKGROUND OF THE INVENTION

1. Field of the Invention

This invention relates to a steering assistance display device which displays required information to a driver when steering a vehicle.

2. Description of Related Art

When approaching a corner while driving a vehicle, the act of "predicting how far to turn the steering wheel" is generally much more difficult for a beginner than for an experienced driver. An experienced driver can understand, in an instinctive fashion, the predicted path of travel of the vehicle, from the relationship between the vehicle speed and the radius of the corner, based on his or her vision and experience, and can perform a steering operation in accordance with this instinctive understanding. On the other hand, a beginner performs a steering operation by looking at a relatively close point on the corner. Therefore, the beginner cannot "read" the end of the corner, and adjusts the steering angle while in the curve, which is liable to give rise to wobbles in the travel of the vehicle.

In order to prevent wobbling of this kind, Japanese Patent Application Publication No. 5-058196 (JP 5-058196 A) discloses displaying virtual vehicle wheels to a driver by a display device, such as a head-up display (HUD), in the vicinity of the bonnet, as a parameter indicating the actual steering angle of the vehicle wheels.

However, by displaying the actual steering angle, it is only possible to provide a predicted path of travel when the vehicle is at low speeds, and it is not possible to prompt a beginner to predict the path of travel in a broad vehicle speed range, and therefore the beginner cannot be prompted to perform a suitable steering operation. In other words, with the available technology, there has been a problem in that it has been difficult to prompt such a driver to perform a suitable steering operation.

SUMMARY OF THE INVENTION

Therefore, it is an object of this invention to provide a steering assistance display device capable of displaying necessary information for prompting a driver to perform a suitable steering operation.

The steering assistance display device relating to an aspect of this invention includes: a detection unit configured to detect a radius of a curved road on which a vehicle is travelling, and a velocity and a steering angle of the vehicle; a calculation unit configured to calculate a direction of travel of the vehicle on the basis of an inertial force determined on the basis of the radius and the velocity, and the steering angle; and a display unit configured to display by an HUD the direction of travel.

According to the steering assistance display device of the aspect of the invention, since the direction of travel of the vehicle is calculated on the basis of an inertial force determined on the basis of the radius and velocity, and the steering angle, then it is possible to prompt a driver to perform a suitable steering operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Below, an embodiment of this invention is described with reference to the drawings.

Figure 1:
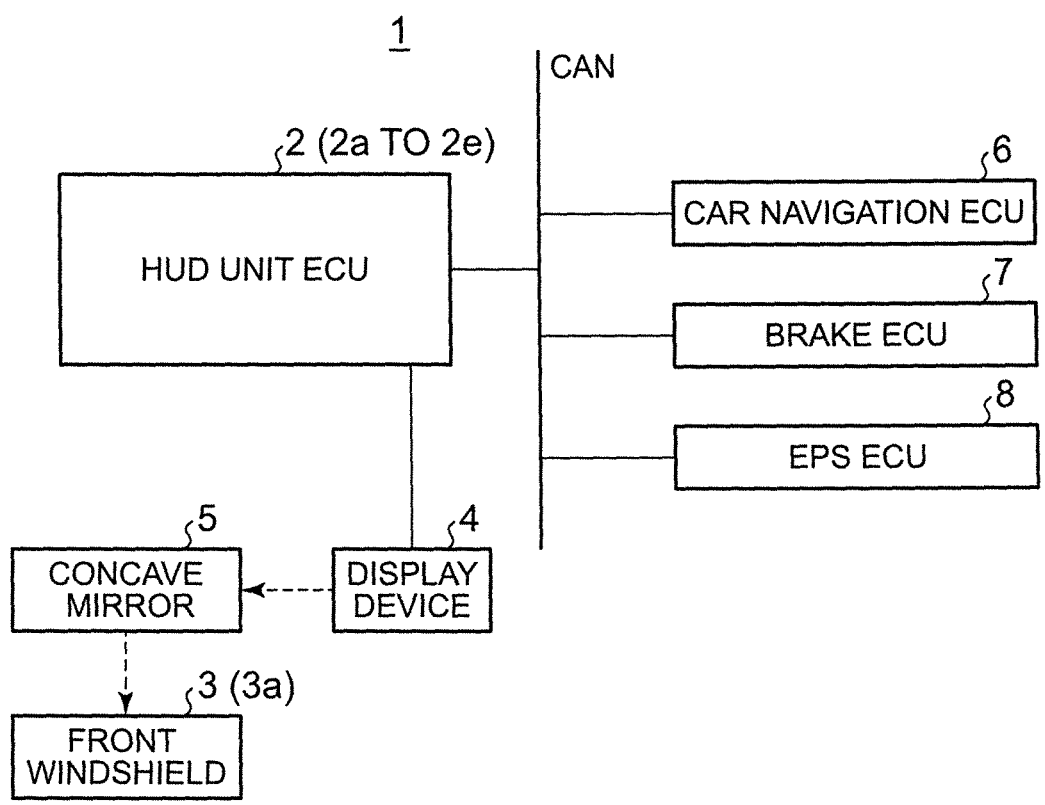
FIG. 1 is a schematic block diagram showing a schematic composition of the steering assistance display device 1 according to a first embodiment of this invention.

As shown in FIG. 1, the steering assistance display device 1 according to the first embodiment includes an HUD unit electronic control unit (ECU) 2, a display device 4, a concave mirror 5 which projects a display image of the display device 4 onto a front windshield 3 of a vehicle, and a reflecting surface 3a, provided on the front shield 3, which reflects the displayed image. The HUD unit ECU 2 is connected to a car navigation ECU 6, a brake ECU 7, and an electronic power steering (EPS) ECU 8, by a communication standard such as controller area network (CAN).

The front windshield 3 is the glass window on the front side of the vehicle, and the reflecting surface 3a is formed by appropriate means, such as providing a combiner, for example, on the surface of the region where a display image of the cabin interior is to be projected.

The display device 4 is composed by an light emitting diode (LED) array including a plurality of LED elements and a thin-film transistor (TFT) screen having a backlight, for example, and projects a display image of the vehicle relating to this invention onto the concave mirror 5. The concave mirror 5 has a function of reflecting and enlarging the projected display image so that the image passes through an opening in an instrument panel (not illustrated) to be projected onto the reflecting surface 3a of the front windshield 3, thereby forming a virtual image in front of the vehicle. A driver views the display image as a virtual image by viewing the reflecting surface 3a.

The HUD unit ECU 2 is, for example, composed by a central processing unit (CPU), a read-only memory (ROM), a random access memory (RAM), a data bus interconnecting these, an input/output interface, and the like, and the CPU carries out the prescribed processing described below, in accordance with a program stored in the ROM. The HUD unit ECU 2 composes a detection unit 2a, a calculation unit 2b and a display unit 2c.

The car navigation ECU 6 detects the location of the vehicle by a global positioning system (GPS) function, and also reads out, from database, map information including the radius R of the road along which the vehicle is travelling, and sends this information to the HUD unit ECU 2 via a CAN.

The brake ECU 7 is an ECU which controls the whole braking function of the vehicle. The brake ECU 7 calculates the velocity V of the vehicle from an output signal from a vehicle wheel speed sensor (not illustrated) and sends data frames including the vehicle velocity V to the HUD unit ECU 2.

The HUD ECU 8 is an ECU for controlling the EPS on the basis of the driver's operation of the steering wheel. The EPS ECU 8 detects the steering angle 0 of the vehicle wheels based on the EPS, by a steering angle sensor (not illustrated), and sends same to the HUD unit ECU 2.

The detection unit 2a of the HUD unit ECU 2 detects, from the CAN, the radius R of a curving road on which the vehicle is travelling, the velocity V of the vehicle, and the steering angle θ, on the basis of communications with the car navigation ECU 6, the brake ECU 7, and the EPS ECU 8. The calculation unit 2b of the HUD unit ECU 2 calculates the direction of travel of the vehicle on the basis of an inertial force, which is determined from the radius R and the vehicle velocity V, and the steering angle θ.

More specifically, the calculation unit 2b calculates a correction steering angle Δθ from the radius R and the vehicle velocity V, and calculates a display steering angle, $\Theta=\theta-\Delta\theta$, as the direction of travel, by subtracting the correction steering angle $\neq\theta$ from the steering angle θ. The display unit 2c of the HUD unit ECU 2 displays a shallow display steering angle θ which is calculated by the formula above, in front of the driver, by the HUD, on the basis of controlling the display device 4.

Figure 2:
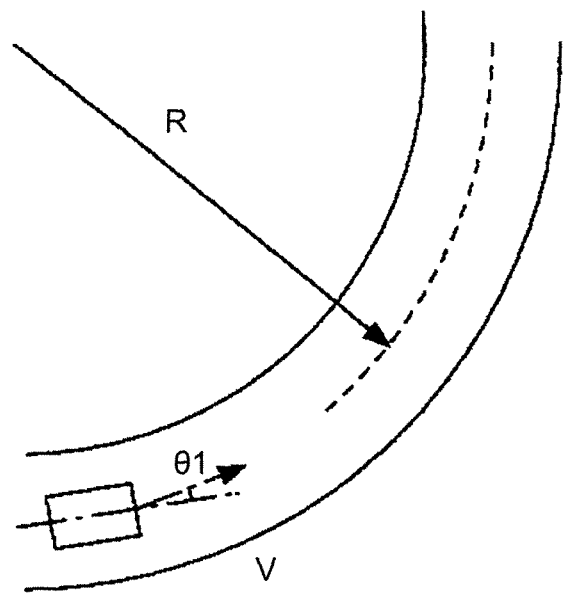
FIG. 2 is a schematic drawing showing a parameter used in calculation of a display steering angle Θ in a steering assistance display device 1 according to the first embodiment.

Here, as shown in FIG. 2, the steering angle of the vehicle travelling at a velocity V along a curving road having a radius of R is taken as θ1. The actual steering angle θ2 detected by the steering angle sensor and sent by the EPS ECU 8 is given by θ1=θ2, if the vehicle velocity V is ignored. This is based on the fact that correction based on the correction steering angle Δθ, which is an inertial force correction, is carried out in the first embodiment. Therefore, in this first embodiment, the steering angle detected by the steering angle sensor is taken as θ, and is used directly in the calculation of the display steering angle Θ.

Figure 3:
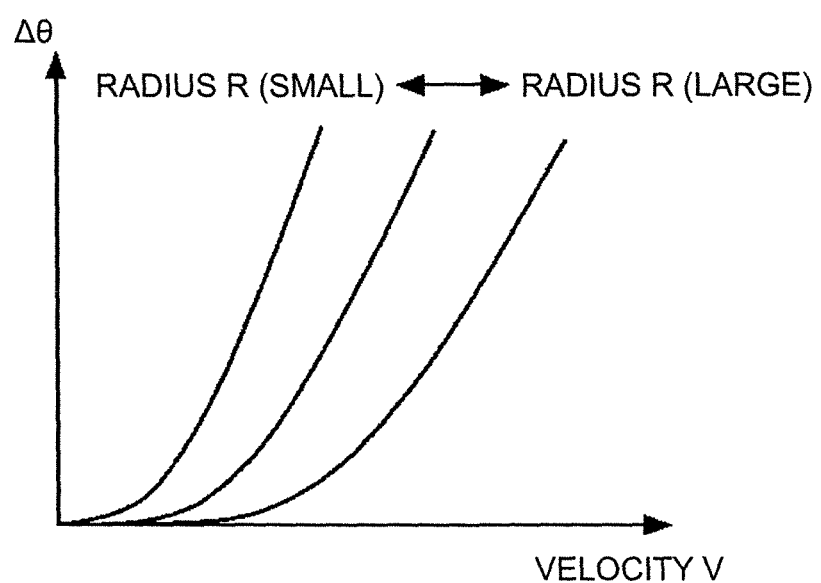
FIG. 3 is a schematic drawing showing a mode of calculating the correction steering angle Δθ based on the velocity V and the radius R, in the steering assistance display device 1 according to the first embodiment.

Furthermore, in calculating the correction steering angle Δθ, the relational expression, $\Delta\theta=\beta mV^2/R=\alpha V^2$ is used. Here, m is the vehicle weight and α and β are coefficients obtained by experimentation or simulation. In other words, as shown in FIG. 3, if the vehicle velocity V is plotted on the horizontal axis and the correction steering angle Δθ is plotted on the vertical axis, then the smaller the radius R, the larger the gradient of the resulting quadratic curve.

Figure 4A:
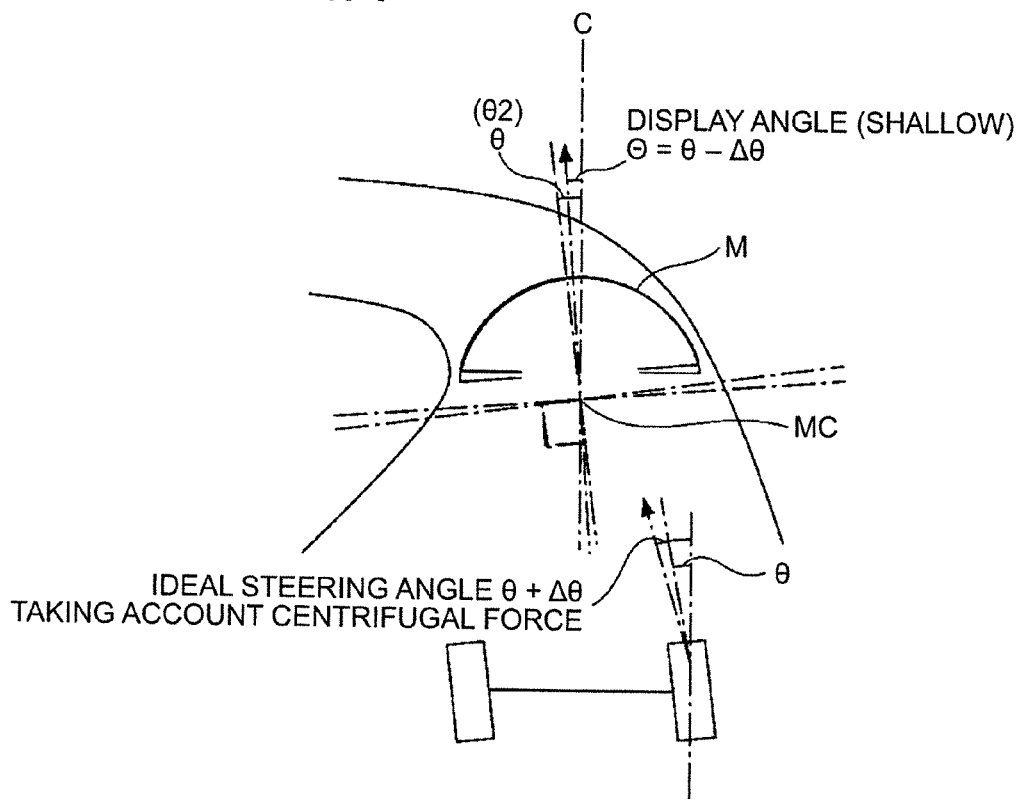
FIG. 4A and 4B are schematic drawings showing a display mode using an assistance display mark for the display steering angle Θ in the steering assistance display device 1 according to the first embodiment.

Here, as shown in FIG. 4A, the display unit 2c displays the display steering angle Θ, on the basis of the rotation of the centre MC of an assistance display mark M, which is an upwardly-convex laterally-long semi-ellipse shape. Here, in FIG. 4A, the single-dotted line C indicates the front/rear direction of the vehicle (vehicle body), and the display steering angle Θ is indicated by the angle between the arrow showing the centre of the assistance display mark M and the single-point line C. In other words, the display steering angle Θ is shown with reference to the front/rear direction C.

Figure 4B:
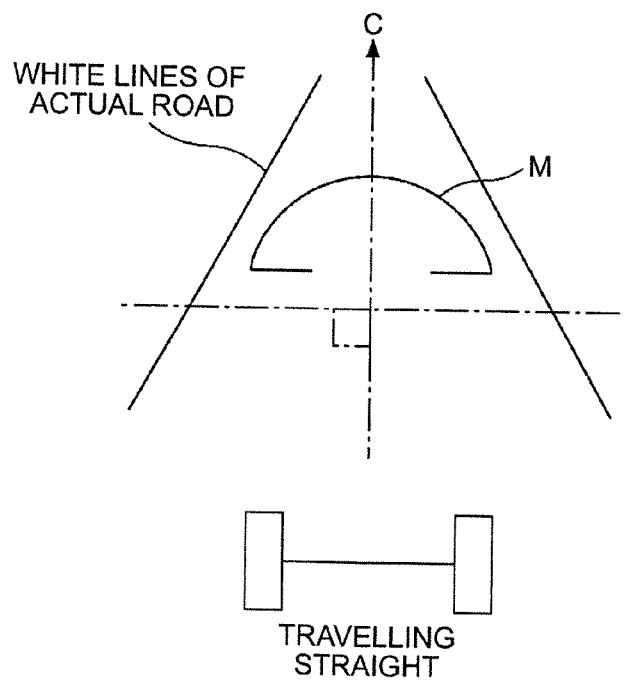

Upon confirming the shallow display steering angle Θ=θ−Δθ which is shown in FIG. 4A, the driver selects an ideal steering angle θ+Δθ on the basis of general driving characteristics (reactive characteristics whereby the driver recognizes that with the current steering operation, the vehicle is travelling to the outside of the curve of the road, and steers the vehicle more tightly). If the vehicle is travelling along a straight road as shown in FIG. 4B, both the steering angle θ and the display steering angle Θ become zero, and the arrow indicating the centre of the assistance display mark M coincides with the dotted line C.

When the detection unit 2a detects the ideal steering angle θ+Δθ after amendment by the driver, the display unit 2c displays the currently amended steering angle θ+Δθ, and in the next control period displays another shallow display steering angle Θ on the basis of the new vehicle velocity V, the radius R and the steering angle θ.

Figure 5:
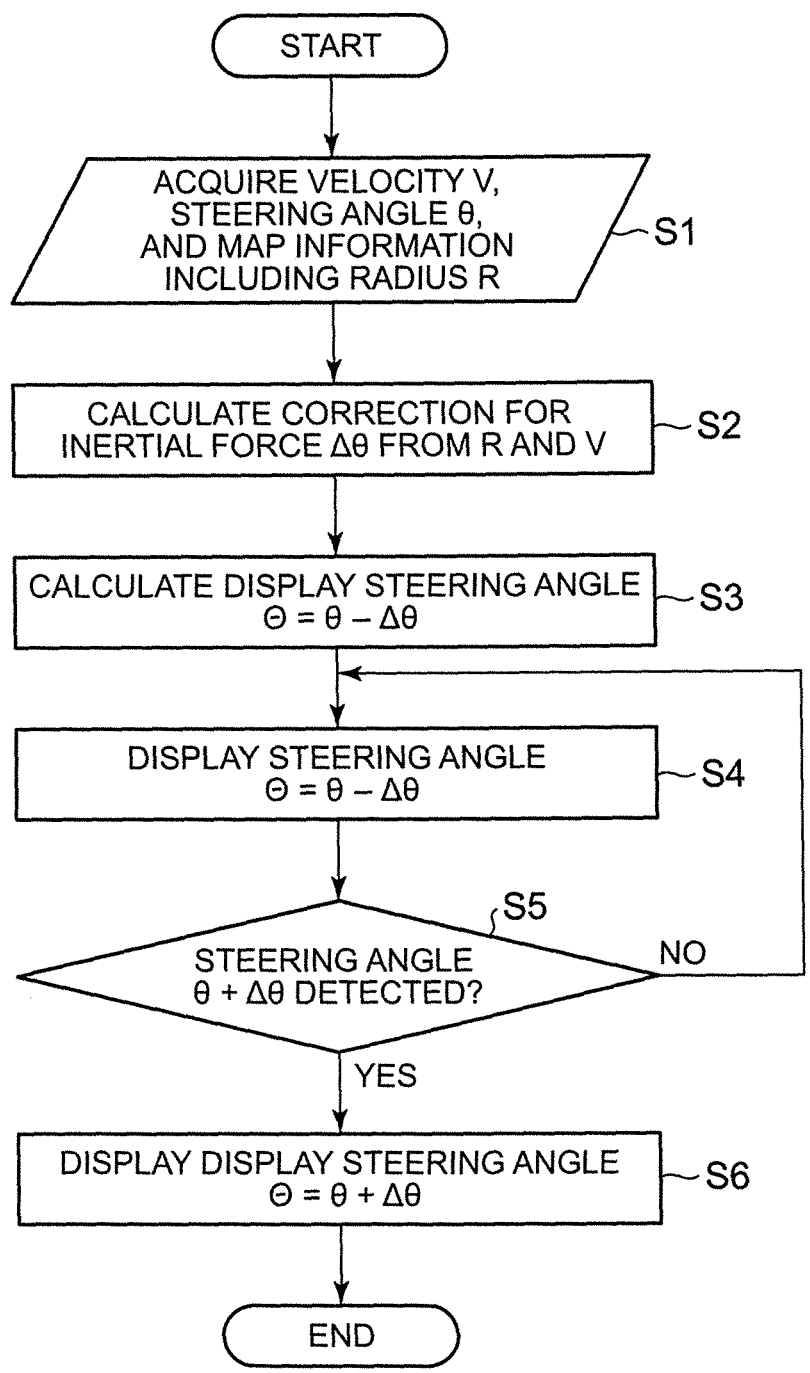
FIG. 5 is a flowchart showing details of control performed by the steering assistance display device 1 according to the first embodiment.

Next, the details of the control performed by the HUD unit ECU 2 according to the first embodiment will be described with reference to the flowchart shown in FIG. 5. As shown in step S1, the detection unit 2a detects and acquires the vehicle velocity V, the steering angle θ, and map information including the radius R, from the CAN. In step S2, the calculation unit 2b calculates a correction steering angle Δθ, which is an inertial force correction, from the radius R and the vehicle velocity V, by the method described above.

In step S3, the calculation unit 2b calculates the display steering angle Θ by subtracting the correction steering angle Δθ from the steering angle θ. In step S4, the display unit 2c displays this shallow display steering angle Θ by using the HUD.

Here, the display processing in step S4 is continued until the driver, in response to the display of the shallow display steering angle Θ, selects the ideal steering angle θ+Δθ, which is a tighter steering angle, based on general driving characteristics, and in step S5, the detection unit 2a detects the steering angle θ+Δθ. When the steering angle θ+Δθ has been detected in step S5, then in step S6, the display unit 2c displays the display steering angle Θ=θ+Δθ.

Figure 6A:
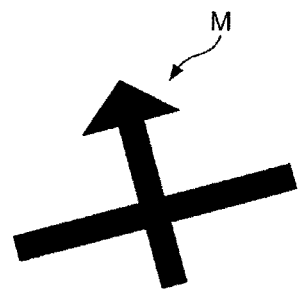
FIGS. 6A to 6E are schematic drawings showing modifications of an assistance display mark for a display steering angle Θ in the steering assistance display device 1 according to the first embodiment.

The mode of the assistance display mark M is not limited to that shown in FIGS. 4A and 4B. For example, as shown in FIG. 6A, the assistance display mark M may adopt a mode which combines a thick-lined arrow with a lateral bar in the left/right direction. Furthermore, as shown in FIG. 6B, the assistance display mark M may adopt a mode which combines a semi-elliptical shape with the mode in FIG. 6A.

Figure 6B:
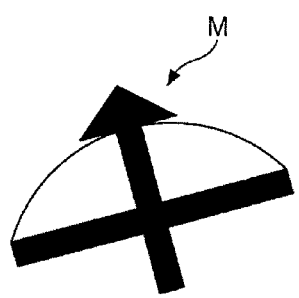
Figure 6C:
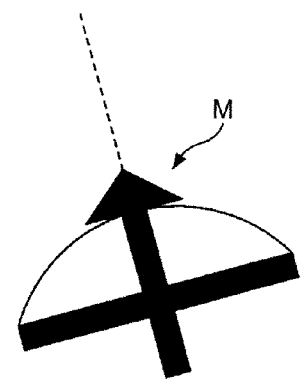
Figure 6D:
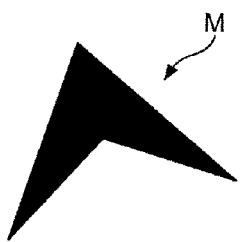
Figure 6E:
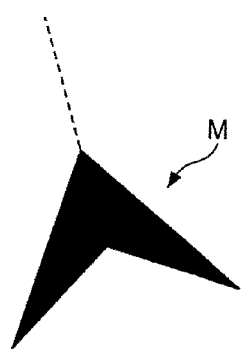

Moreover, as shown in FIG. 6C, the assistance display mark M may adopt the mode in FIG. 6B, and also include a dotted line indicating the direction of the thick dotted arrow. Furthermore, as shown in FIG. 6D, the assistance display mark M may also be a chevron shape formed by an isosceles triangle having different angles with the bottom edge removed, and as shown in FIG. 6E, may also include a dotted line indicating the direction of orientation of the chevron.

According to the steering assistance display device 1 according to the first embodiment described above, the following actions and beneficial effects can be obtained. More specifically, in the first embodiment, by determining a correction steering angle Δθ which takes account of inertial forces, from the vehicle velocity V and the radius R, and showing the display angle Θ shallowly, it is possible to cause the driver to select an ideal steering angle θ+Δθ which is a tighter steering angle that takes account of the inertial force. In other words, in the first embodiment, it is possible to prompt a suitable steering operation at high speeds, which could not be achieved conventionally.

In the first embodiment described above, the display steering angle Θ is used as the direction of travel of the vehicle, but it is also possible to use the predicted path of travel. A second embodiment related thereto is described below. The hardware composition of the steering assistance display device 1 according to the second embodiment is the same as that shown in the first embodiment, and therefore the description centers on the points of difference.

In the steering assistance display device 1 according to the second embodiment, the calculation unit 2b of the HUD unit ECU 2 calculates a correction steering angle Δθ from the radius R and the vehicle velocity V, calculates a travel steering angle Θ by subtracting the correction steering angle Δθ from the steering angle θ, and calculates the predicted path of travel D as the direction of travel of the vehicle, on the basis of the travel steering angle Θ and the vehicle velocity V. In other words, the calculation unit 2b calculates the travel steering angle Θ and the predicted path of travel D when continuing in the path of travel direction B included in map information including the radius R, by autonomous navigation, for example. The display unit 2c displays the predicted path of travel D on the HUD, together with the path of travel direction B.

Figure 7:
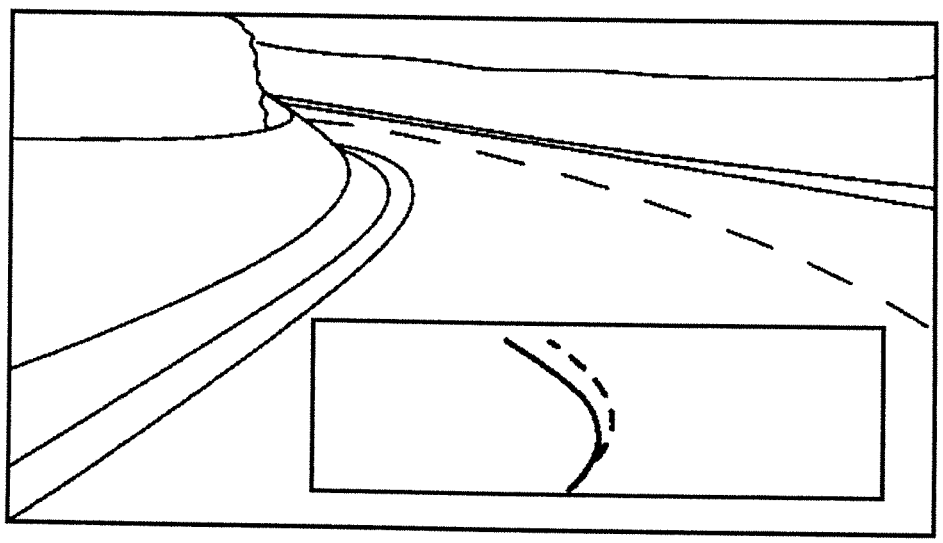
FIG. 7 is a schematic drawing showing a display mode of a predicted path of travel D in the steering assistance display device 1 according to a second embodiment.

The display mode of the display unit 2c is as shown in FIG. 7, for example. In other words, the display unit 2c displays the predicted path of travel D in green as a dotted line, and displays the path of travel direction B in white as a solid line. Below, the details of control by the steering assistance display device 1 according to the second embodiment are described with reference to FIG. 8.

Figure 8:
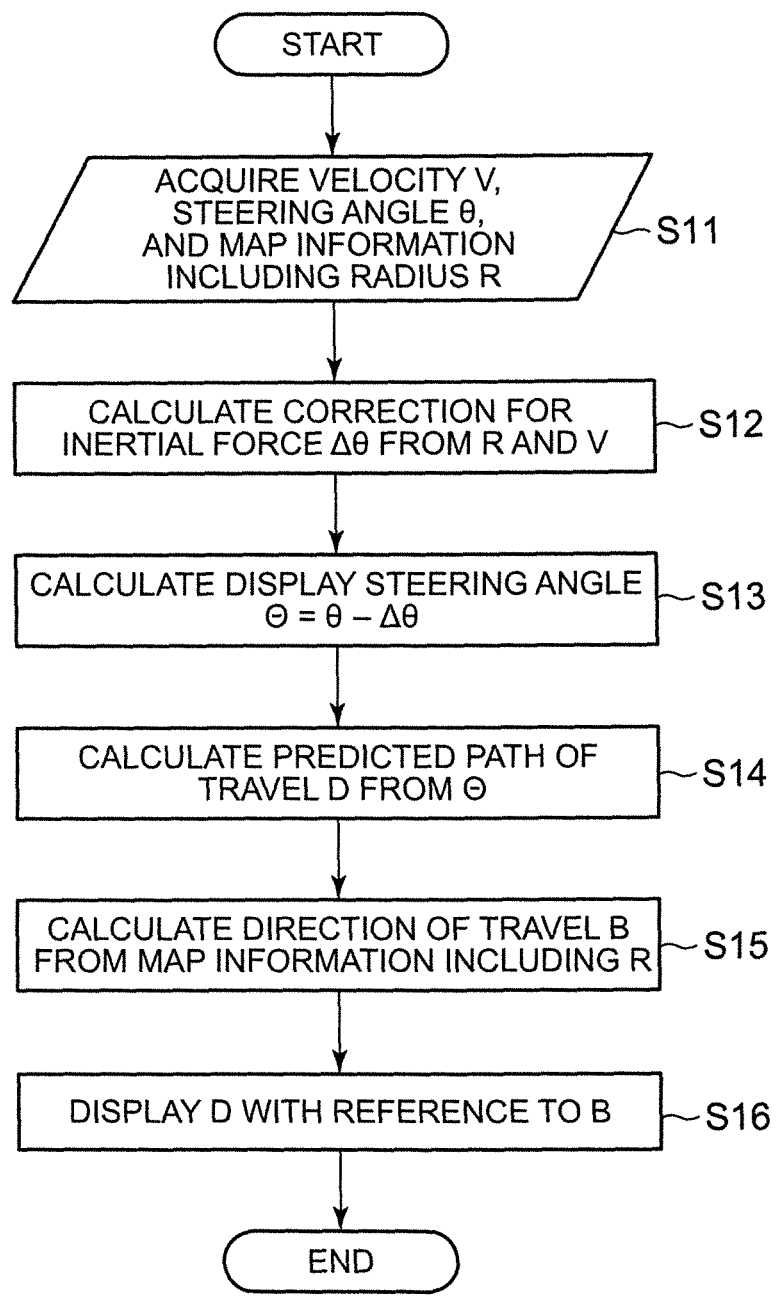
FIG. 8 is a flowchart showing details of control performed by the steering assistance display device 1 according to the second embodiment.
Figure 9:
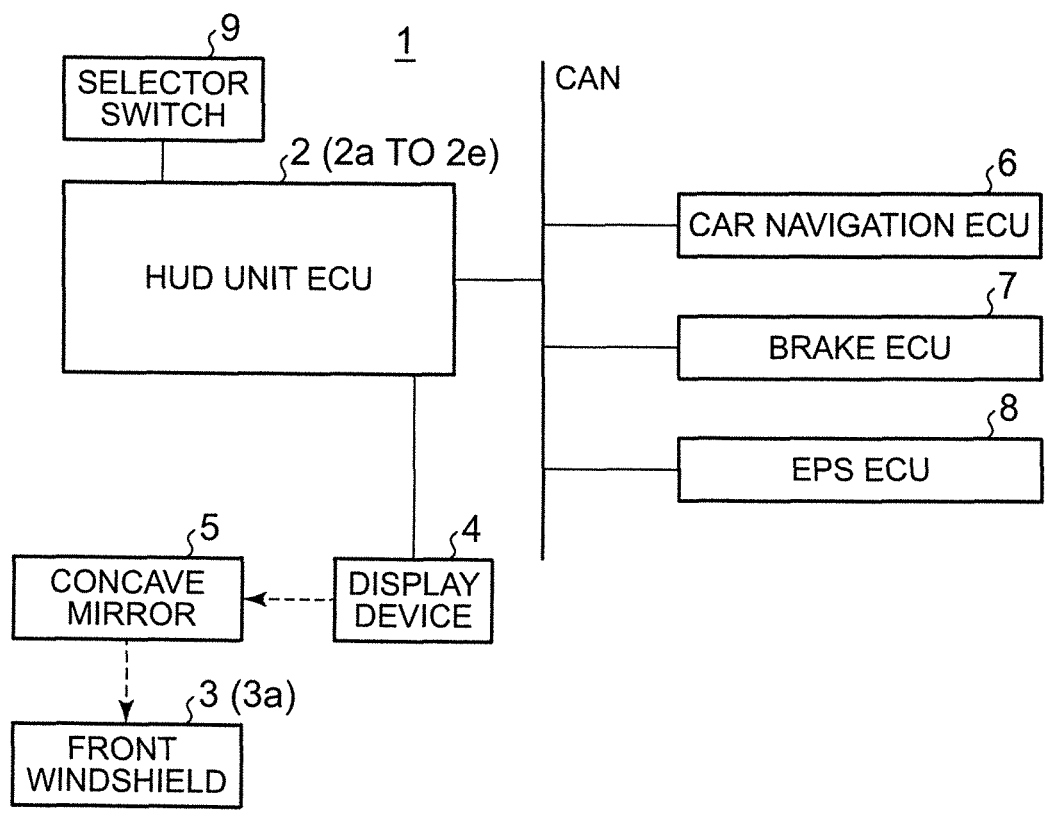
FIG. 9 is a schematic block diagram showing a schematic composition of the steering assistance display device 1 according to a third embodiment of this invention.

As shown in step S11 in FIG. 8, the detection unit 2a acquires the vehicle velocity V, the steering angle θ, and map information including the radius R, from the CAN. In step S12, the calculation unit 2b calculates the correction steering angle Δθ, which is an inertial force correction, from the radius R and the vehicle velocity V, by a similar method to that in the first embodiment. In step S13, the calculation unit 2b calculates the travel steering angle Θ=θ−Δθ, and in step S14, the calculation unit 2b calculates the predicted travel of path D from the travel steering angle Θ.

In step S15, the calculation unit 2b calculates the path of travel direction B from the radius R and the map information. In step S16, the display unit 2c displays the predicted path of travel D, with reference to the path of travel direction B.

According to the steering assistance display device 1 of the second embodiment described above, the following actions and beneficial effects can be obtained. More specifically, by determining a correction steering angle Δθ that takes account of inertial force, and a shallow travel steering angle Θ=θ−Δθ, from the vehicle velocity V and the radius R, and displaying a shallow predicted path of travel D based on the travel steering angle Θ, it is possible to cause the driver to select an ideal steering angle θ+Δθ which is a tighter steering angle that takes account of inertial force. In other words, in the second embodiment, it is possible to prompt a suitable steering operation at high speeds, which could not be achieved conventionally.

In the second embodiment described above, it is also possible display an even more shallow predicted path of travel D on the basis of the selection made by the driver. A third embodiment related thereto is described. The hardware composition of the steering assistance display device 1 according to the third embodiment is the composition shown in the second embodiment, to which a selector switch 9 is added as a selection unit. The following description centers on the points of difference.

Figure 10:
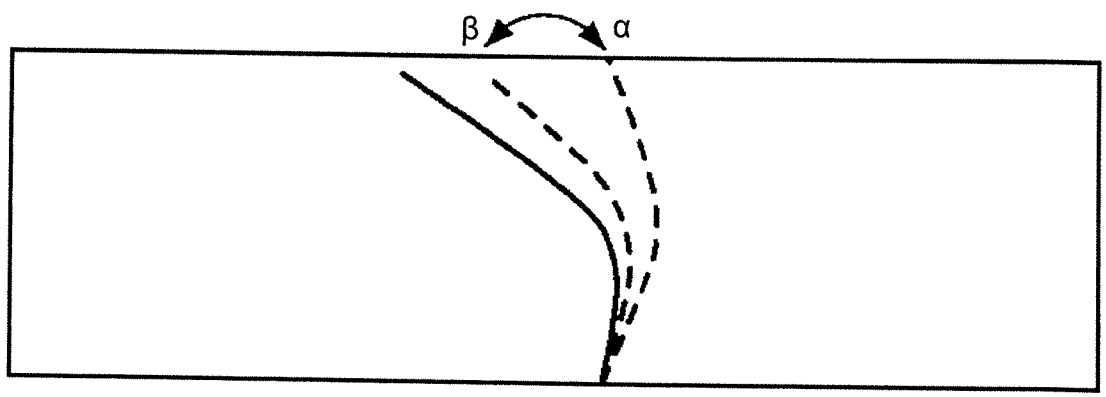
FIG. 10 is a schematic drawing showing a display mode of a predicted path of travel D in the steering assistance display device 1 according to the third embodiment.

More specifically, the steering assistance display device 1 according to the third embodiment includes a selector switch 9 as a selection unit capable of selecting an inside mode for travelling the inner side of the radius R of a curving road. The driver can select "inside mode", on the basis of an appropriate operation of the selector switch 9. As shown in FIG. 10, if this "inner mode" is selected (α in FIG. 10), then the display unit 2c displays the predicted path of travel D on the outer side of the radius R, compared to when the inside mode is not selected (β in FIG. 10).

Figure 11:
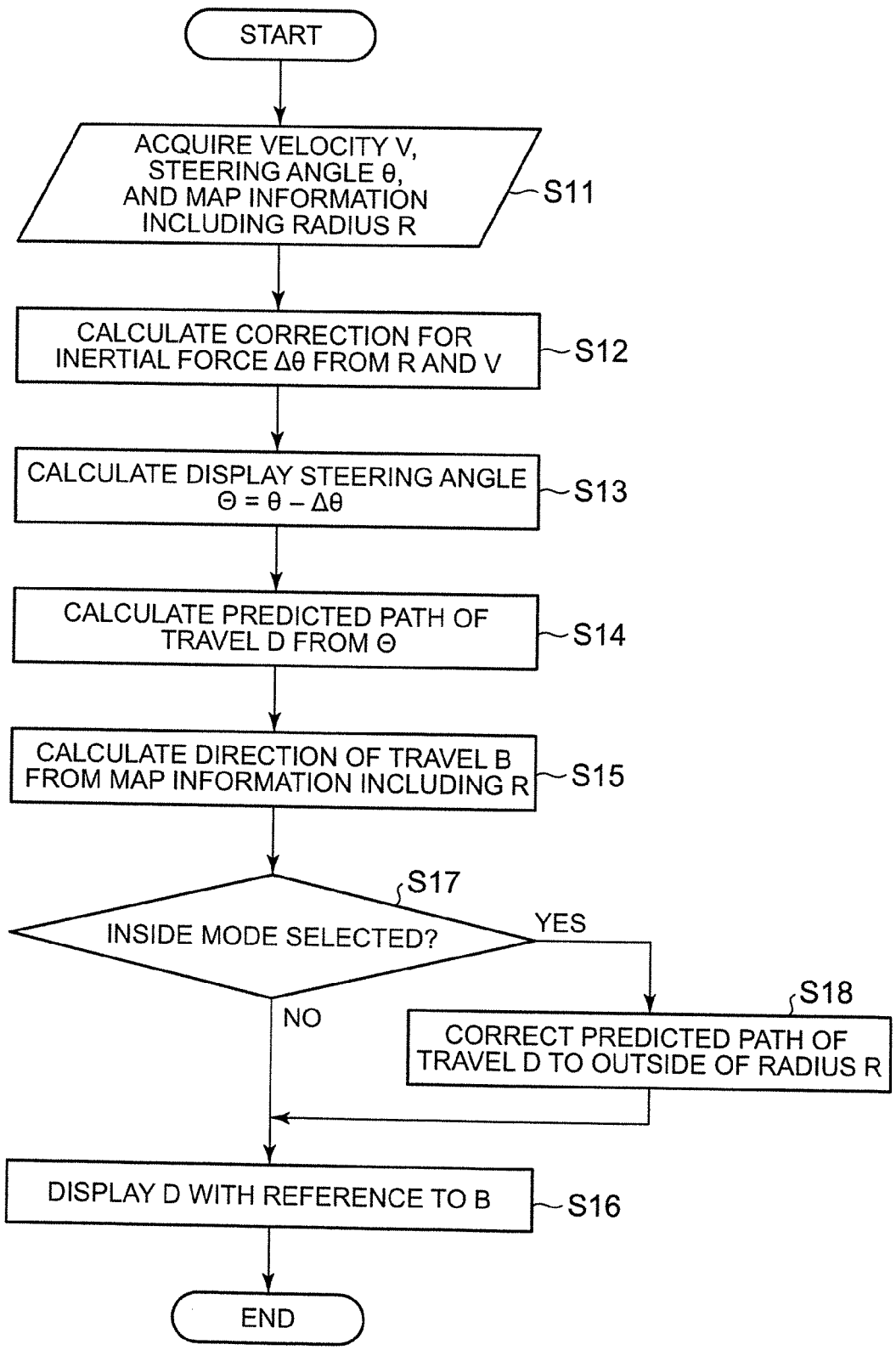
FIG. 11 is a flowchart showing details of control performed by the steering assistance display device 1 according to the third embodiment.

The control details of the third embodiment are as shown in the flowchart in FIG. 11. In the flowchart in FIG. 11, steps S17 and S18 are added to the flowchart shown in FIG. 8. As shown in step S17, the calculation unit 2b amends the predicted path of travel D so as to be positioned to the outer side of the radius R, if the "inside mode" is selected by the selector switch 9. In step S16, the display unit 2c displays the amended predicted path of travel D and the path of travel direction B, by the HUD.

In other words, according to the third embodiment, in the steering assistance display device 1 shown in the second embodiment, it is possible to select to travel on the inside of the curving road, on the basis of a selection made by the driver. Moreover, if the past travel trajectories of the vehicle with respect to curving roads as illustrated by the diagonal lines in FIG. 12 are available, for instance, in a database controlled by the car navigation ECU 6, and furthermore, if the past slippage history of the vehicle with respect to curving roads as indicated by the mesh hatching in FIG. 13 is available in the abovementioned database, then these can also be displayed by the display unit 2c.

In other words, a "performance-based travel mode" in which the vehicle is caused to travel along a past travel trajectory of the vehicle on a curving road can be selected by a selector switch 9 (a selection unit), and if this performance-based travel mode is selected, then the display unit 2c displays the travel trajectory by the HUD.

Figure 14:
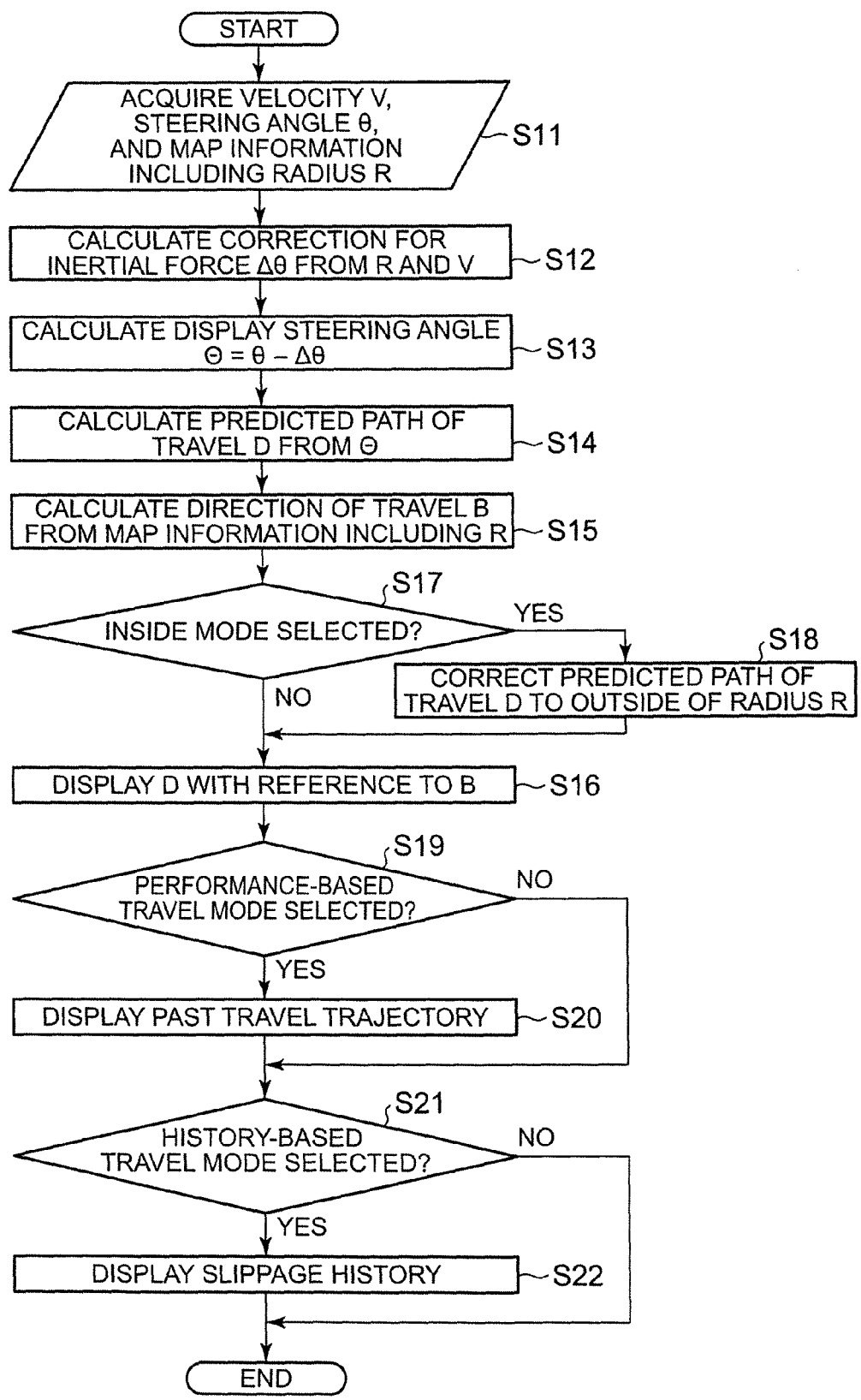
FIG. 14 is a flowchart showing a modification of the details of control performed by the steering assistance display device 1 according to the third embodiment.

Similarly, a "history-based travel mode" in which the vehicle is caused to travel in accordance with past slippage history of the vehicle on a curving road can be selected by a selector switch 9 (a selection unit), and if this history-based travel mode is selected, then the display unit 2c displays the slippage history by the head-up display. As shown in FIG. 14, these control details are executed by the HUD unit ECU 2 by adding the processing details from step S19 to S22, to the control details in FIG. 11. Only one of the steps 19 and 20 in which, if this performance-based travel mode is selected, then the display unit 2c displays the travel trajectory by the HUD, and the steps in which, if this history-based travel mode is selected, then the display unit 2c displays the slippage history by the head-up display may be applied a control flowchart as shown in FIG. 14.

Figure 12:
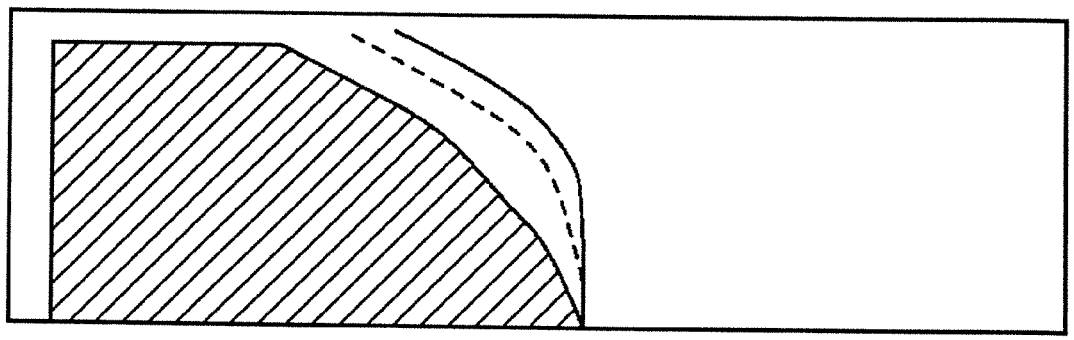
FIG. 12 is a schematic drawing showing a modification of a display mode of a predicted path of travel D in the steering assistance display device 1 according to the third embodiment.
Figure 13:
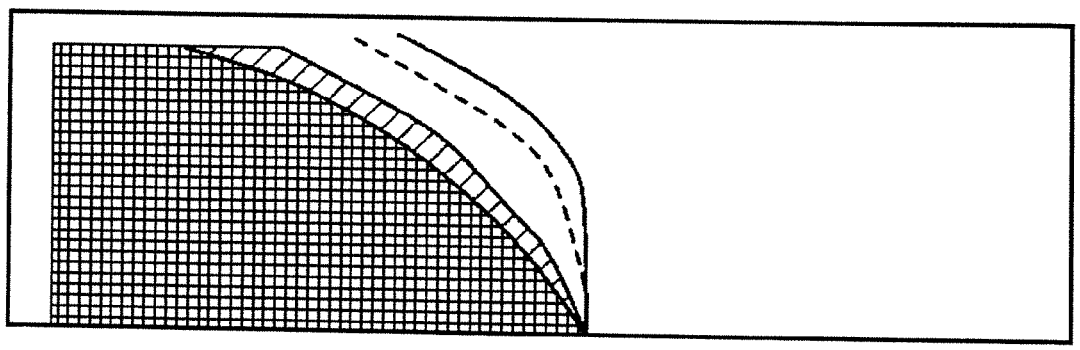
FIG. 13 is a schematic drawing showing a modification of a display mode of a predicted path of travel D in the steering assistance display device 1 according to the third embodiment.

In other words, as shown in step S19, the calculation unit 2b determines whether or not the "performance-based travel mode" has been selected by the selector switch 9 and if this mode has been selected, then in step S20, the display unit 2c displays a past travel trajectory as shown in FIG. 12. Furthermore, in step S21, the calculation unit 2b determines whether or not the "history-based travel mode" has been selected by the selector switch 9 and if this mode has been selected, then in step S22, the display unit 2c displays a past slippage trajectory as shown in FIG. 13.

The dotted line shown in FIG. 12 differs in significance from the dotted line shown in FIG. 10, and indicates a path of travel which the driver is predicted to trace, in combination with a past travel trajectory. Similarly, the dotted line shown in FIG. 13 indicates a trajectory that the driver is predicted to trace, in combination with a past slippage history. Therefore, it is possible to provide customized travel based on the travel performance of the driver. Here, customized travel is a travel mode which is suited to sports travel on a circuit, or limit travel during testing.

Embodiments of this invention were described in detail above, but this invention is not limited to the embodiments described above, and it is also possible to add various modifications and substitutions to the embodiments given above, without departing from the claims of the invention.

In the embodiment described above, the detection unit 2a detects the radius R on the basis of the GPS function of the car navigation ECU 6 and map information, but the detection unit 2a may also detect the radius R by a white line detection device.

The above-described embodiments of the invention can prompt a driver to perform a suitable steering operation, by determining a correction steering angle $\Delta\theta$ that takes account of the inertial force, from the vehicle velocity V and the radius R, and displaying the display steering angle $\Theta$ or predicted path of travel D shallowly.

Consequently, the steering assistance display device according to the embodiments of the invention is useful in that it can be applied to various automobiles.

What is claimed is:

1. A steering assistance display device, comprising:
a detection unit configured to detect a radius of a curved road on which a vehicle travels, and a velocity and a steering angle of the vehicle;
a calculation unit configured to calculate a correction steering angle from the radius and the velocity, and calculate a display steering angle, as a direction of travel of the vehicle, by subtracting the correction steering angle from the steering angle; and
a display unit configured to display, by a head-up display, the display steering angle, as the direction of travel of the vehicle, by a rotation of an assistance display mark having an upwardly convex shape.

2. A steering assistance display device comprising:
a detection unit configured to detect a radius of a curved road on which a vehicle travels, and a velocity and a steering angle of the vehicle;
a selection unit configured to select an inside mode for traveling on the inside of the radius of the curved road;
a calculation unit configured to calculate a correction steering angle from the radius and the velocity, calculate a travel steering angle by subtracting the correction steering angle from the steering angle, and calculate a predicted path of travel as a direction of travel of the vehicle of the basis of the travel steering angle, and
a display unit configured to display, by a head-up display, the predicted path of travel, as the direction of travel of the vehicle, on the outside of the radius when the inside mode is selected, compared to when the inside mode is not selected.

3. The steering assistance display device according to claim 2, wherein
the selection unit is configured to select a performance-based travel mode for travelling along a past travel trajectory of the vehicle on the curved road; and
the display unit is configured to display the travel trajectory when the performance-based travel mode is selected.

4. The steering assistance display device according to claim 2, wherein
the selection unit is configured to select a history-based travel mode for travelling in accordance with a past slippage history of the vehicle on the curved road; and
the display unit is configured to display the slippage history when the history-based travel mode is selected.

* * * * *